United States Patent
Kato et al.

(10) Patent No.: US 9,323,642 B2
(45) Date of Patent: Apr. 26, 2016

(54) CALCULATION APPARATUS, CALCULATION METHOD, AND RECORDING MEDIUM FOR CALCULATION PROGRAM

(71) Applicant: FUJITSU LIMITED, Kawasaki-shi, Kanagawa (JP)

(72) Inventors: Miho Kato, Kawasaki (JP); Hiroyuki Suzuki, Mishima (JP); Tsubasa Kitayama, Yokohama (JP); Norio Kurobane, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 384 days.

(21) Appl. No.: 13/707,746

(22) Filed: Dec. 7, 2012

(65) Prior Publication Data

US 2013/0166941 A1 Jun. 27, 2013

(30) Foreign Application Priority Data

Dec. 21, 2011 (JP) .................................. 2011-280551

(51) Int. Cl.
*G06F 1/14* (2006.01)
*G06F 11/34* (2006.01)

(52) U.S. Cl.
CPC .............. *G06F 11/3419* (2013.01); *G06F 1/14* (2013.01); *G06F 2201/815* (2013.01); *G06F 2201/88* (2013.01); *Y02B 60/165* (2013.01)

(58) Field of Classification Search
USPC .......................................... 713/500, 501, 502
See application file for complete search history.

(56) References Cited

U.S. PATENT DOCUMENTS

| 7,242,223 | B1 * | 7/2007 | Alon ................................ 327/39 |
| 7,571,338 | B2 * | 8/2009 | Osterling et al. ............. 713/500 |
| 7,599,460 | B2 * | 10/2009 | Matsuo et al. ................. 375/373 |
| 7,873,858 | B2 * | 1/2011 | Sung et al. ..................... 713/500 |
| 2009/0296531 | A1 * | 12/2009 | Haartsen et al. ................ 368/47 |
| 2009/0312856 | A1 | 12/2009 | Jong et al. |
| 2010/0031259 | A1 | 2/2010 | Inoue |

FOREIGN PATENT DOCUMENTS

| CN | 102057356 A | 5/2011 |
| JP | 63-170744 | 7/1988 |
| JP | 2010-39513 | 2/2010 |
| JP | 2011-18163 | 1/2011 |

OTHER PUBLICATIONS

Japanese Office Action dated May 12, 2015 in corresponding Japanese Patent Application No. 2011-28055.
Chinese Office Action issued Jul. 27, 2015 in corresponding Chinese patent application No. 201210559889.8.

* cited by examiner

*Primary Examiner* — Zahid Choudhury
(74) *Attorney, Agent, or Firm* — Staas & Halsey LLP

(57) ABSTRACT

A calculation method includes calculating, by a processor, a difference between a first value and a second value, the first value being read from a clock counter that counts pulses of a clock signal having a plurality of types of frequencies, supplied to the processor in response to control command to start processing for an unit to be allocated to the processor, the second value being read from the clock counter in response to control command to stop processing.

8 Claims, 29 Drawing Sheets

FIG. 5

| T1 |
|---|
| THREAD ID |
| NUMBER OF CLOCKS UPON ACTIVATION clk0 |
| NUMBER-OF-CLOCK INCORPORATED VALUE S |
| ACTIVATION TIME t0 |
| TIME INCORPORATED VALUE St |
| PROGRAM COUNTER |
| STACK POINTER |

| PROCESS ID | THREAD ID |
|---|---|
| A-1 | a |

| PROCESS ID | THREAD ID |
|---|---|
| B-1 | b |
|  | c |

| PROCESS ID | THREAD ID |
|---|---|
| A-2 | d |

FIG. 11

| PROGRAM ID | PROCESS ID |
|---|---|
| A | A-1 |
|   | A-2 |
| B | B-1 |
|   | B-2 |
| C | C-1 |

| PROGRAM ID | PROGRAM OPERATION AMOUNT (T) |
|---|---|
| A | 1234567890123 |
| B | 456789012345 |
| C | 67890123 |

★APPLICATION USAGE STATUS★

| APPLICATION | NUMBER OF CLOCKS (×10⁹) | POWER CONSUMPTION (W) | HEATING VALUE (kal) | CO2 CONSUMPTION (×10⁻⁶TONS) |
|---|---|---|---|---|
| A | 1234.6 | | | |
| B | 456.8 | | | |
| C | 0.0 | | | |

| VMID | PROGRAM ID |
|---|---|
| X | A |
|   | B |
|   | C |
| Y | D |
|   | E |
| Z | F |

| VMID | VM OPERATION AMOUNT (U) |
|---|---|
| X | 12345678901234 |
| Y | 567890123456 |
| Z | 78901234 |

★CUSTOMER'S USAGE STATUS★

| YEAR/MONTH | FEE (YEN) | NUMBER OF CLOCKS (×10$^9$) | POWER CONSUMPTION (W) | CO2 CONSUMPTION (TONS×10$^{-5}$) |
|---|---|---|---|---|
| 2011/11 | | 12346 | | |
| 2011/10 | | 78901 | | |
| 2011/9 | | 23456 | | |
| 2011/8 | | 78901 | | |

| VMID | PROGRAM ID | CORRESPONDING RELATIONSHIP BETWEEN VMs |
|---|---|---|
| X | A | – |
| | B | – |
| | C | – |
| XX | XA | X |
| Y | D | – |
| | E | – |
| YY | YA | Y |
| Z | F | – |

FIG. 23

| VMID | VM OPERATION AMOUNT (U) |
|---|---|
| X | 12345678901234 |
| XX | 567890 |
| Y | 567890123456 |
| YY | 7890123 |
| Z | 78901234 |

| PROCESS ID + CLID | THREAD ID + CLID |
|---|---|
| A-1-C1 | a-C1 |

| PROCESS ID + CLID | THREAD ID + CLID |
|---|---|
| B-1-C1 | b-C1 |
|  | c-C1 |

| PROCESS ID + CLID | THREAD ID + CLID |
|---|---|
| A-2-C1 | d-C1 |

| PROGRAM ID + CLID | PROCESS ID + CLID |
|---|---|
| A-C1 | A-1-C1 |
| | A-2-C1 |
| B-C1 | B-1-C1 |
| | B-2-C1 |
| C-C1 | C-1-C1 |

| PROGRAM ID + CLID | PROGRAM OPERATION AMOUNT (T) |
|---|---|
| A-C1 | 1234567890123 |
| B-C1 | 456789012345 |
| A-C2 | 4561234567890 |

T11

CALCULATION APPARATUS, CALCULATION METHOD, AND RECORDING MEDIUM FOR CALCULATION PROGRAM

CROSS-REFERENCE TO RELATED APPLICATION

This application is based upon and claims the benefit of priority of the prior Japanese Patent Application No. 2011-280551, filed on 21 Dec., 2011, the entire contents of which are incorporated herein by reference.

FIELD

The embodiments discussed herein are related to measurement technology using a computer.

BACKGROUND

Processing by multiple virtual machines may be performed on one physical machine. There is technology for estimating the power consumption of virtual machines performing processing on a physical machine, based on the usage ratio of central processing units (CPUs) of the virtual machines.

The usage ratio of each CPU is calculated based on how much time the CPU is occupied by processing for a program. In contrast, there is technology that varies an operating frequency (clock frequency) used to synchronize a circuit in accordance with a property such as the processing load of a CPU; in order to reduce the power consumed and heat radiated by the CPU. When control to vary the operating frequency of a CPU is performed, the actual number of operations per unit time of the CPU becomes different before and after the operating frequency is varied. Because power is consumed when the CPU operates, if the operating frequency of the CPU varies and the number of operations per unit time of the CPU changes, the power consumption of the CPU also varies. A related art method that estimates power consumption in accordance with the time that a CPU is occupied does not take into consideration changes in power consumption due to variation of the operating frequency. Thus, for a program that is to be executed, if the amount of time in which a CPU is occupied is the same before and after the operating frequency is varied, although the actual number of operations of the CPU varies, power consumption before and after the variation is mistakenly estimated to be the same.

SUMMARY

According to an aspect of the invention, a calculation method includes calculating, by a processor, a difference between a first value and a second value, the first value being read from a clock counter that counts pulses of a clock signal having a plurality of types of frequencies, supplied to the processor in response to control command to start processing for an unit to be allocated to the processor, the second value being read from the clock counter in response to control command to stop processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of the date structure of a thread context.

FIG. 10A illustrates the relationship between a process and a thread.

FIG. 10B illustrates the relationship between a process and a thread.

FIG. 10C illustrates the relationship between a process and a thread.

FIG. 11 illustrates the relationship between a program and a process.

FIG. 12 illustrates the number of operations for each program.

FIG. 15 illustrates an example of screen information that displays a measurement result.

FIG. 18 illustrates the relationship between a virtual machine and a program.

FIG. 19 illustrates the number of operations for each virtual machine.

FIG. 20 illustrates an example of screen information displaying a measurement result.

FIG. 22 illustrates the relationship between a virtual machine and a program.

FIG. 23 illustrates an example of the number of operations for each virtual machine.

FIG. 27A illustrates the relationship between a process and a thread.

FIG. 27B illustrates the relationship between a process and a thread.

FIG. 27C illustrates the relationship between a process and a thread.

FIG. 28 illustrates the relationship between a program and a process.

FIG. 29 illustrates an example of the number of operations for each program.

DESCRIPTION OF EMBODIMENTS

Power consumption of a processor varies in accordance with the frequency of a clock signal supplied to the processor.

Because the processor charges and discharges the circuit in the processor once in accordance with a clock signal for one cycle, varying the frequency of the clock signal causes the number of times charging and discharging is performed per unit time to vary. The frequency of a clock signal varies when, for example, the source of the clock signal is switched between multiple oscillators that generate clock signals at different frequencies, or when the frequency of a clock signal generated by an oscillator is shifted over time.

For example, over a certain time interval t, the number of times a processor charges and discharges when the processor operates at a frequency f1 is f1·t, and the number of times the processor charges and discharges when the processor operates at a frequency f2 is f2·t. There is a method of estimating power consumption based on the time over which the processor operates. When the number of operations of the processor is evaluated based on time, if measurement is performed for a certain time that exceeds t represented by expression (1), an error of one or more times of charging and discharging is caused. In other words, when the number of operations of the processor over the certain time range t is measured, if the clock frequency varies by (f1−f2), represented in expression (1), or greater, an error equivalent to one or more clock cycles is caused. Thus, when the frequency varies by (f1−f2), represented in expression (1), or greater over the time range t to be measured, it may be desirable to take into consideration the fluctuation of the frequency of the clock signal.

$$t \leq |1/(f1-f2)| \quad (1)$$

Hereinafter, embodiments of the present invention will be described with reference to the drawings. First, the configuration of a computer 1 according to a first embodiment is described based on FIGS. 1 to 3.

Figure 1:
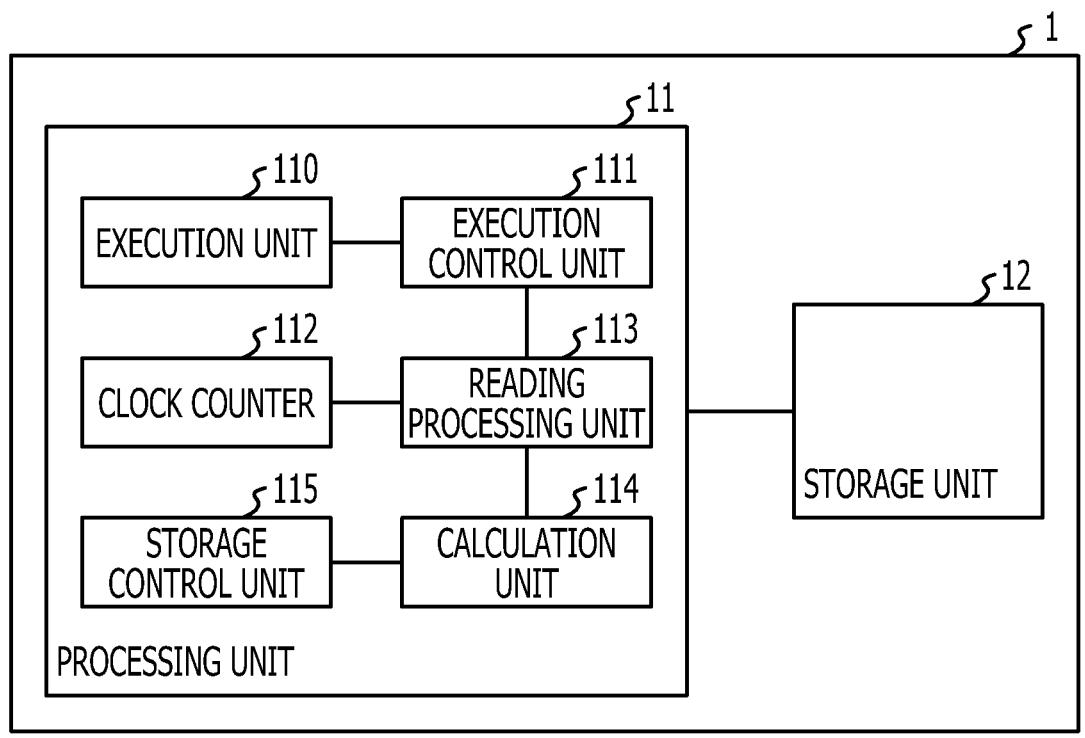
FIG. 1 illustrates an example of the functional configuration of a computer.

FIG. 1 illustrates an example of the functional configuration of the computer 1. The computer 1 includes a processing unit 11 and a storage unit 12. The processing unit 11 includes an execution unit 110, an execution control unit 111, a clock counter 112, a reading processing unit 113, a calculation unit 114, and a storage control unit 115.

Figure 2:
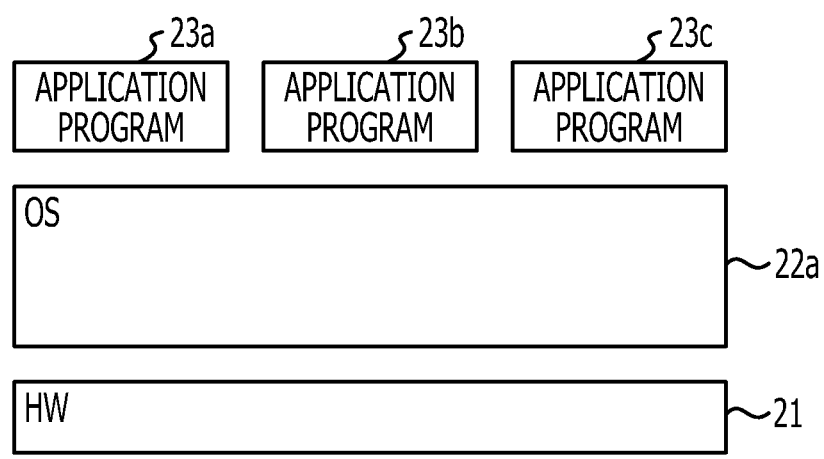
FIG. 2 illustrates an example of the software configuration of the computer.

FIG. 2 illustrates an example of the software configuration of the computer 1. In the example of the software configuration illustrated in FIG. 2, multiple types of application programs including an application program 23a, an application program 23b, and an application program 23c run on the computer 1. Application programs running on the computer 1 are not limited to the application programs 23a to 23c. For example, application programs other than the application programs 23a to 23c may run on the computer 1. Furthermore, an operating system (OS) 22a that performs control and management to cause hardware (HW) 21 to perform processing for the application programs 23a to 23c runs on the computer 1. The hardware 21 is hardware described later using FIG. 3.

Figure 3:
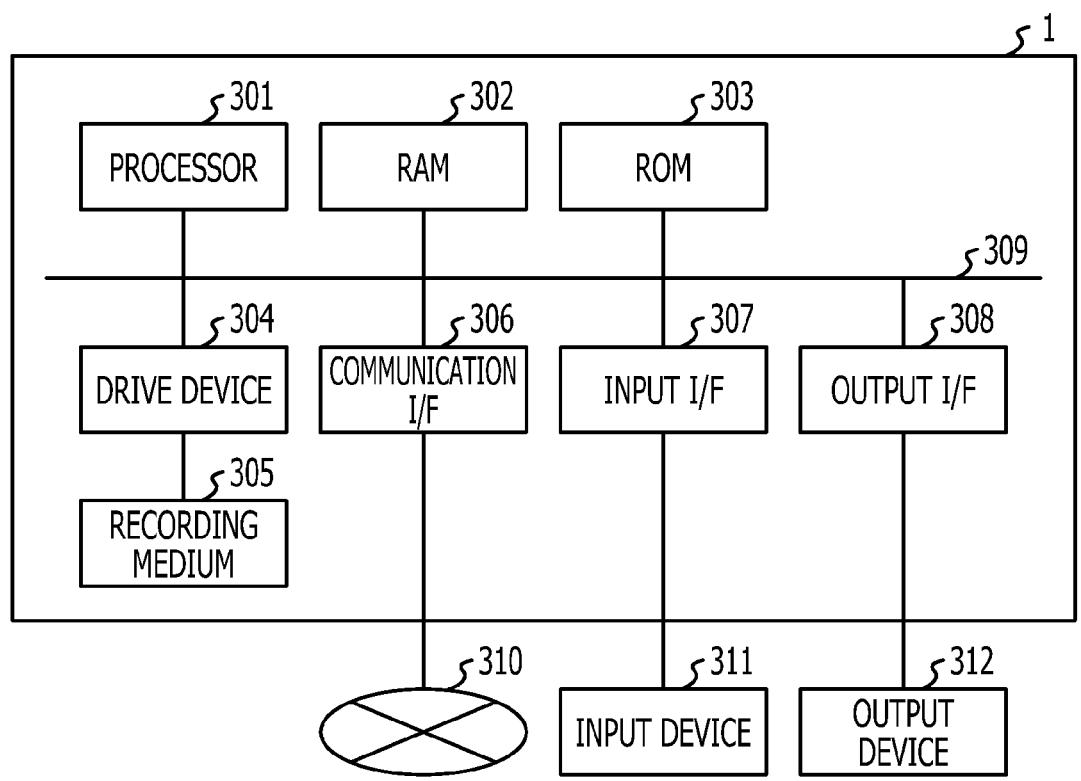
FIG. 3 illustrates an example of the hardware configuration of the computer.

FIG. 3 illustrates an example of the hardware configuration of the computer 1. The computer 1 includes a processor 301, a random-access memory (RAM) 302, a read-only memory (ROM) 303, a drive device 304, a recording medium 305, a communication interface (I/F) 306, an input interface (I/F) 307, and an output interface (I/F) 308. The processor 301 operates by varying an operating frequency that is used to synchronize with a circuit related to the operation of the processor 301. The processor 301, the RAM 302, the ROM 303, the drive device 304, the communication interface 306, the input interface 307, and the output interface 308 are coupled to a bus 309. The communication interface 306 is coupled to a network 310. The input interface 307 is coupled to an input device 311. The output interface 308 is coupled to an output device 312.

The configuration of each element of the computer 1 illustrated in FIGS. 1 to 3 will be described.

Functions of the processing unit 11 are realized by, for example, the processor 301 performing processing based on the OS 22a, the application programs 23a to 23c, or the like. Functions of the storage unit 12 are realized by, for example, reading and writing information to or from the RAM 302 or the recording medium 305 or the like under control of the processor 301.

Under control of the execution control unit 111, which is described later, the execution unit 110 performs processing for the application programs 23a to 23c. Functions of the execution unit 110 are realized by, for example, the processor 301 loading the application programs 23a to 23c, which are read from the recording medium 305 to the RAM 302, and processing commands included in the loaded programs.

The execution control unit 111 schedules processing of the application programs 23a to 23c that is performed by the execution unit 110. When the processing of each application program is performed with multitasking, the execution control unit 111 performs control to allocate a process, which is a processing unit of an application program, to the processor 301. The timing of when to allocate the process is decided by determination of a processing status that is based on the algorithm of a process scheduler included in the execution control unit 111. Similarly, when processing of each application program is performed with multithreading, the execution control unit 111 performs control to allocate a thread, which is a processing unit of an application program, to the processor 301. The timing of when to allocate a thread is decided by determination of a processing status that is based on the algorithm of a thread scheduler included in the execution control unit 111. Functions of the execution control unit 111 are realized by, for example, the processor 301 and the RAM 302 operating based on the OS 22a which includes the process scheduler or the thread scheduler.

The clock counter 112 is a counter that is incremented in accordance with the cycle that a clock used to synchronize with a circuit as part of processing performed by the processor 301 operates at. The clock counter 112 is included in the processor 301. When the processor 301 is a multi-core processor, a counter is provided for each core, and the number of operations of each core is measured based on the counter included with each core. In the following description, unless otherwise noted, the case in which the processor 301 includes a single core will be described by way of example. The clock counter 112 indicates, at a certain time, how many operations the processor 301 has performed up to that time. For example, the clock counter 112 starts counting upon activation of the hardware 21. Every time the time equivalent to one cycle of the operating frequency of the processor 301 elapses (that is, every pulse), control is performed to add, for example, 1 bit to a register provided for the clock counter 112. The register storing the value of the clock counter 112 has a region whose size is, for example, 32 bits or 64 bits. In the following description, the clock value read in response to a read command is treated as a variable clk0.

The reading processing unit 113 performs processing to read the clock value from the clock counter 112 included in the processor 301, in accordance with control in scheduling performed by the execution control unit 111 to generate, activate (causing to be in an execution state), stop (causing to be in a sleep state), or terminate a process or a thread. Functions of the reading processing unit 113 are realized by, for example, the processor 301 executing control according to the OS 22a in which a read command is added to a command group that causes scheduling control to be executed.

The read command is a command that reads the value of the clock counter 112 included in the processor 301. The read command is, for example, a performance monitoring mechanism (implemented in each type of CPU).

Under control of the execution control unit 111, the calculation unit 114 performs arithmetic operations (see expressions (2) to (4)) using a clock value (clk1) read by the reading processing unit 113. For example, when the reading processing unit 113 reads the clock value (clk1) in accordance with generation or activation of a process or a thread by the execution control unit 111, the calculation unit 114 performs an arithmetic operation (see expression (2)) to assign the variable clk0 with the clock value (clk1). When the reading processing unit 113 reads the clock value (clk1) in accordance with stopping or termination of a process or a thread by the execution control unit 111, the calculation unit 114 calculates the difference d between the clock value (clk1) and the value (clk0) (see expression (3)). Furthermore, the calculation unit 114 performs an arithmetic operation (see expression (4)) to incorporate the difference d between the clock value (clk1) and the value (clk0) into an incorporated value S. The incorporated value S is a value written to and read from the storage unit 12 by the storage control unit 115 described later. Initial values of the value (clk0) and the incorporated value S are values such as 0. In addition, "=" included in expressions (2) to (4) is an operand indicating assignment, not an equals sign.

$$clk0=clk1 \quad (2)$$

$$d=clk1-clk0 \quad (3)$$

$$S=S+d \quad (4)$$

Functions of the calculation unit 114 are realized by causing the processor 301 to perform arithmetic operations in expressions (2) to (4) based on the clock value (clk1) at the time of process or thread control of a process or a thread (control of generation, activation, stopping, or termination of a process or a thread) by the OS 22a. The clock value clk0 and the clock value clk1 are each stored in a register or the like in the processor 301.

The storage control unit 115 reads data stored in the storage unit 12 and writes data to the storage unit 12 in accordance with the execution control unit 111. For example, in accordance with control to stop or terminate a process or thread, the storage control unit 115 reads, from the storage unit 12, the context of the process or thread that is to be stopped or terminated. Context is information about a process or a thread and includes the incorporated value S corresponding to the process or thread. Functions of the storage control unit 115 are realized by the processor 301 reading the incorporated value S from a process context or thread context corresponding to a process or thread that is to be stopped or terminated.

In addition, for example, the storage control unit 115 stores, in the storage unit 12, information that associates the incorporated value S calculated by the calculation unit 114 with a process or thread that is to be stopped or terminated by the execution control unit 111. Functions of the storage control unit 115 are realized by the processor 301 writing the incorporated value S, which is calculated by the processor 301 performing the arithmetic operations in expressions (3) and (4), into a process context or thread context that corresponds to the process or thread to be stopped or terminated. Furthermore, for example, as part of the activation or generation of a process or a thread by the execution control unit 111, the storage control unit 115 stores the value clk0, which calculated by the processor 301 performing the arithmetic operation in expression (2), in the process context or thread context of the process or thread that is activated or generated.

In another method, every time the calculation unit 114 calculates the difference d, the storage control unit 115 stores the calculated difference d in the corresponding process context or thread context. When the same process or thread is run multiple times, the difference d is stored multiple times in the same process context or thread context.

With the above processing performed by the execution unit 110, the execution control unit 111, the clock counter 112, the reading processing unit 113, the calculation unit 114, and the storage control unit 115 included in the processing unit 11, the number of clock ticks involved in the processing of a process or a thread is counted for each process or thread executed by the processor 301.

Each element of hardware illustrated in FIG. 3 is further described below.

The RAM 302 is a readable and writable memory. For example, a semiconductor memory such as static RAM (SRAM) or dynamic RAM (DRAM) is used as the RAM 302. Alternatively, flash memory or the like may also be used instead of RAM. The ROM 303 may include a programmable ROM (PROM) or the like. The drive device 304 is a device that performs at least one of reading from and writing information to the recording medium 305. The recording medium 305 stores information written by the drive device 304. The recording medium 305 is a recording medium such as a hard disk, a compact disc (CD), a digital versatile disc (DVD), or a Blu-ray disc. For example, the computer 1 has drive devices 304 and recording media 305 for multiple types of recording media.

The input device 311 is a device that sends an input signal in response to physical operation. The input device 311 is, for example, a key device such as a keyboard or buttons attached to the main body of the computer 1, or a pointing device such as a mouse or a touch panel. The output device 312 is a device that outputs information in response to control by the computer 1. The output device 312 is, for example, an image output device such as a display, or an audio output device such as a loudspeaker. An input and output device such as a touch screen, for example, may be used as the input device 311 and the output device 312.

Figure 4:
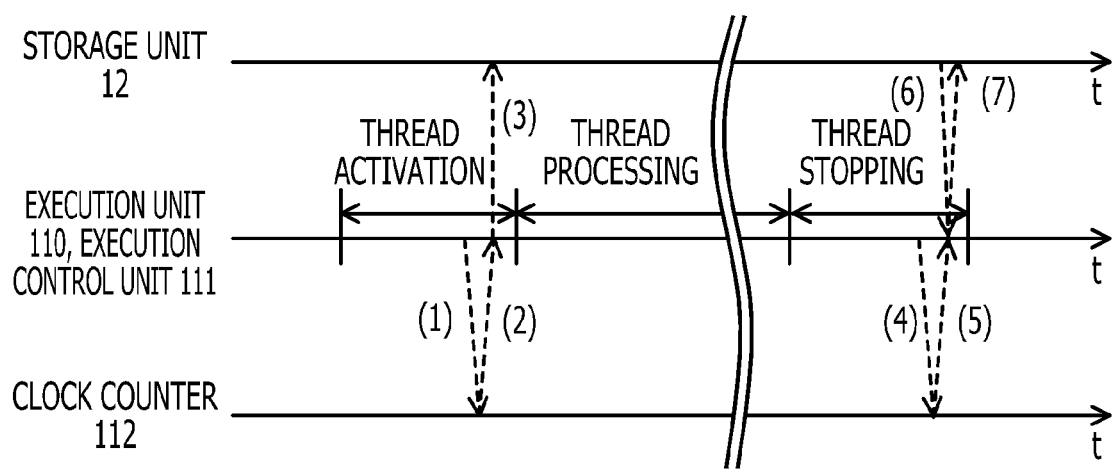
FIG. 4 illustrates how data reading works in accordance with thread control.
Figure 6:
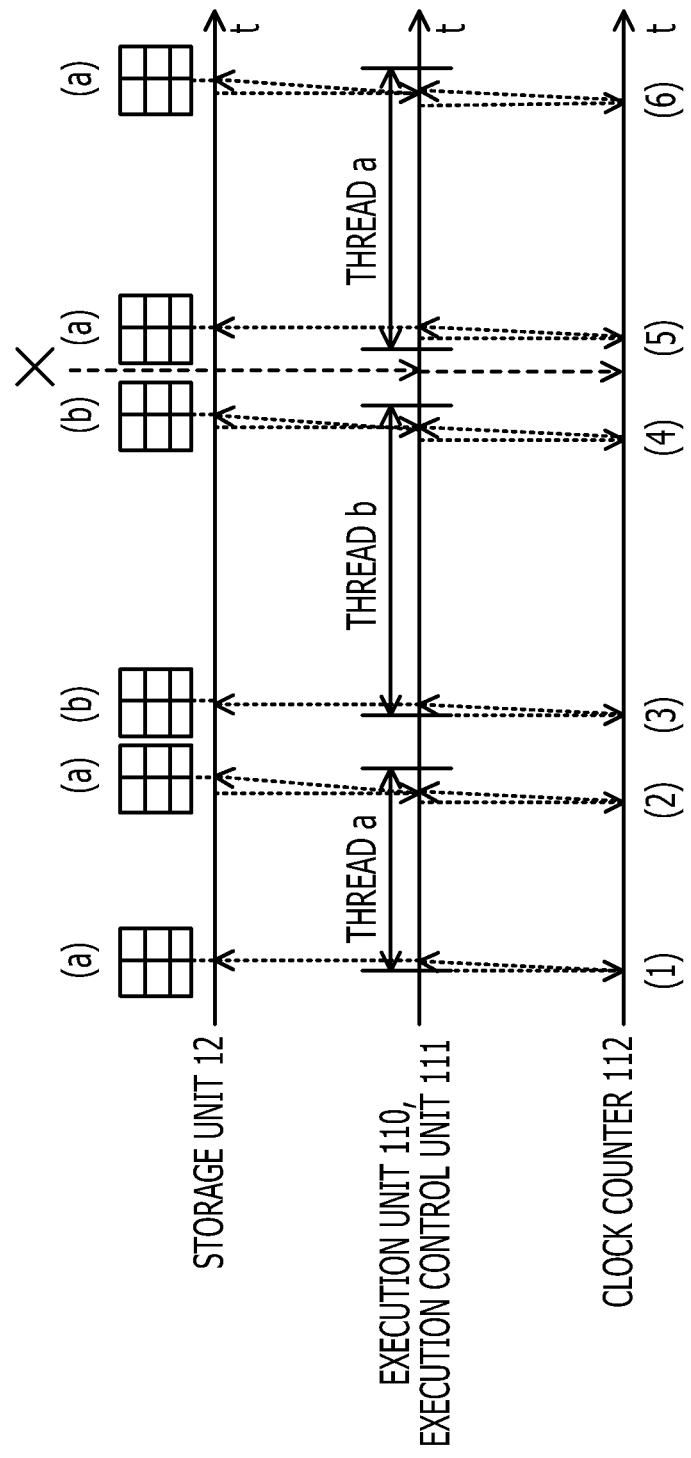
FIG. 6 illustrates how data reading works in accordance with thread control.

Referring now to FIGS. 4 to 6, the relationship how data reading is performed while multiple threads are active will be described. Although a case in which multithreading is performed is illustrated in FIGS. 4 to 6, the relationship in data reading is the same as or similar to that in the case where multitasking is performed.

FIG. 4 illustrates a relationship related to data reading that is between the execution unit 110 and the clock counter 112 as well as a thread context stored in the storage unit 12.

The execution control unit 111 activates a thread (or generates a thread when there is no thread) according to the thread scheduler. During thread activation processing performed by the execution control unit 111, the reading processing unit 113 performs processing to read the number of clock ticks from the clock counter 112 (arrows (1) and (2)). With processing performed by the calculation unit 114 and the storage control unit 115, the read number of clock ticks (clk1) is written as the initial number of clock ticks (clk0) into a thread context T1 illustrated in FIG. 5 (writing to clk0: arrow (3)). When activation of the thread is completed, the execution unit 110 performs processing for the activated thread, based on information included in the thread context T1 illustrated in FIG. 5.

FIG. 5 illustrates an example of the data structure of the thread context T1. The thread context T1 includes processing information used for thread processing performed by the processor 301, as well as thread management information. The processing information is information that specifies a data reading position, such as a program counter or a stack pointer. The execution unit 110 performs processing based on the processing information, which is specified in the information in the thread context T1. The thread management information includes a thread identifier (ID), time information (time t0 at which the thread is activated, incorporated value St of thread processing time, and the like), and number-of-clock-ticks information (the initial number of clock ticks of the thread clk0, and the incorporated value S of the number of clock ticks involved in thread processing).

A process context used in multitasking control has, for example, a data structure that is the same as or similar to the thread context T1 illustrated in FIG. 5, and includes a process ID instead of a thread ID. The process context further includes, for example, information about a thread running within the process.

The execution control unit 111 performs thread stopping processing in response to, for example, switching to another thread. In the thread stopping processing, the storage control unit 115 saves processing information, such as a program counter or a stack pointer, in the thread context T1. During the thread stopping processing, the reading processing unit 113 performs processing to read the number of clock ticks from the clock counter 112 (arrows (4) and (5)). The calculation unit 114 and the storage control unit 115 calculate the incorporated value S based on the read number of clock ticks (clk1) and the number of clock ticks written to the thread context T1 during activation processing (obtaining clk0: arrow (6)), and write the incorporated value S in the thread context T1 (arrow (7)).

With the above processing, the computer 1 is capable of recording the number of clock ticks, counted from the reading point at arrows (1) and (2) to the reading point at arrows (4) and (5), in the thread context T1.

FIG. 6 illustrates the relationship how data reading is performed when there are multiple threads. A period indicated as a "thread a" in FIG. 6 indicates a period involved in processing for thread activation, thread processing, and thread stopping of "thread a".

Writing processing that is performed by the storage control unit 115 to activate and stop "thread a" is performed on a thread context (a) based on the number of clock ticks read at arrows (1) and (2). Thread context (a) is a thread context for "thread a". Writing processing that is performed by the storage control unit 115 to activate and stop a "thread b" is performed on a thread context (b) based on the number of clock ticks read at arrows (3) and (4). Thread context (b) is the thread context for "thread b". Furthermore, when processing of "thread a" is again performed after processing of "thread b", writing processing that is performed by the storage control unit 115 to activate and stop "thread a", is performed on the thread context (a) based on the number of clock ticks read at arrows (5) and (6). The number of clock ticks involved in the processing of each thread is counted by the above storage control unit 115 that updates the incorporated value S that is included in each thread context.

In the first embodiment, the operating frequency of the processor 301 may vary. For example, if the operating frequency of the processor 301 changes at a time indicated by arrow X, the operating frequency of the processor 301 is different between the time indicated by arrows (1) and (2) and the time indicated by arrows (5) and (6). That is, the number of operations per unit time is different in presuming an operation is an instruction that is executed in 1 clock tick. Therefore, evaluation of the load of the processor 301, based on time between arrows (1) and (2) and time between arrows (5) and (6), by using a related art method that measures time in which the processor 301 is occupied, results in inconsistency because the actual number of operations per unit time is different. However, in the first embodiment, even when the operating frequency varies, the actual number of operations of the processor 301 may be measured between arrows (1) and (2) and between arrows (5) and (6) before and after the fluctuation.

Figure 7:
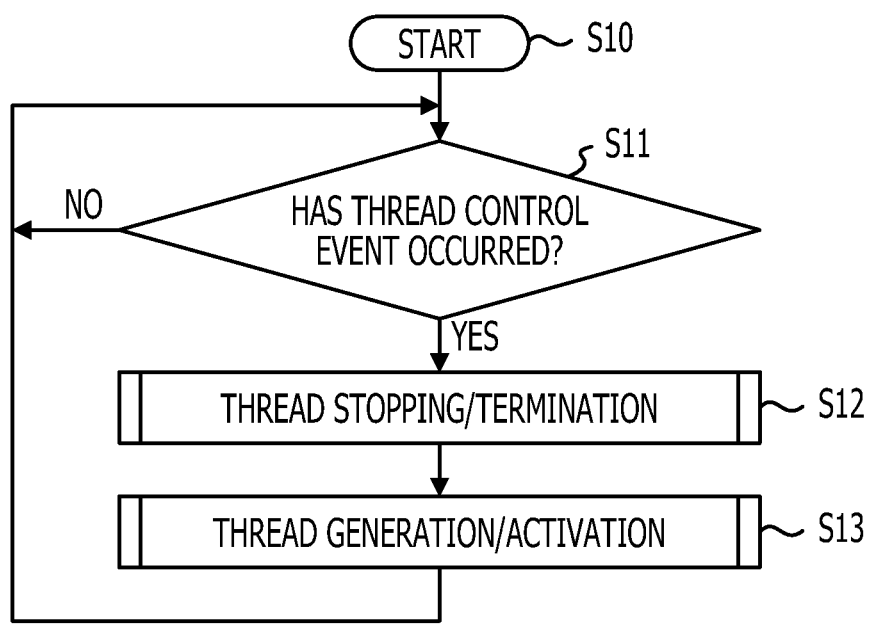
FIG. 7 illustrates the flowchart of control performed by an execution control unit 111.

FIG. 7 illustrates the flowchart of control performed by the processing unit 11 to count the number of clock ticks involved in processing each thread. This control is, for example, control performed by the processor 301 in accordance with the OS 22a. A flowchart that is the same as or similar to that in FIG. 7 is performed when the number of clock ticks involved in processing of each process is counted. In that case, however, the control is performed on a process, not on a thread.

At first, the execution control unit 111 determines whether a thread control event has occurred (S11). When it is determined by the execution control unit 111 that a thread control event has occurred (YES in S11), the execution control unit 111 starts processing to stop or terminate a thread (S12). The processing in S12 is described later. When the processing in S12 ends, the execution control unit 111 starts processing to generate or activate a thread (S13). The processing in S13 is also described later. Determination of whether to give rise to a thread control event is performed by the multi-thread scheduler included in the OS 22a, in accordance with the status of a process allocated to the processor 301, such as when processing of a thread being executed is completed or when interruption by another thread occurs.

Figure 8:
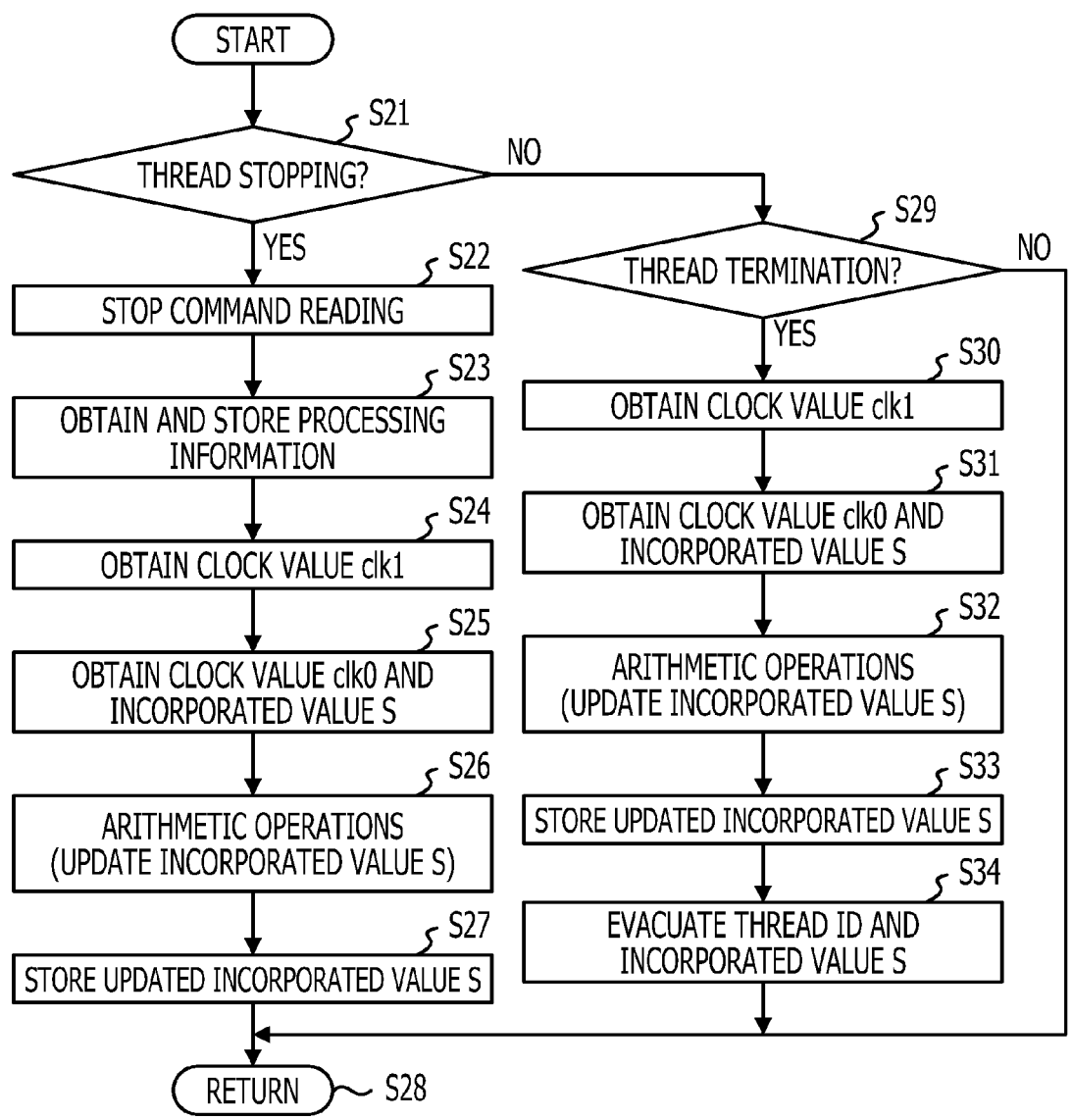
FIG. 8 illustrates a processing flowchart for thread stopping and termination.

FIG. 8 illustrates an example of the above processing to stop or terminate a thread (S12). Firstly, the execution control unit 111 determines whether the event that occurred is for stopping a thread (S21). When the event that occurred is not for stopping a thread (NO in S21), the execution control unit 111 determines whether the event that occurred is for terminating a thread (S29). Generation of an event and processing performed in accordance with the generation of an event are determined by the multi-thread scheduler included in the OS 22a, in accordance with circumstances such as whether an interrupt has occurred or whether thread processing has ended.

When the event that occurred for stopping a thread (YES in S21), the execution control unit 111 stops reading commands for the thread being processed by the processor 301 (S22). After the processing in S22, the execution control unit 111 obtains processing information for the thread for which command reading has been stopped. For example, the execution control unit 111 reads values of the program counter and the stack pointer in the processor 301. Furthermore, the execution control unit 111 controls the storage control unit 115 to store the read processing information in a thread context that corresponds to the thread being stopped, which is stored in the storage unit 12 (S23).

When the processing in S23 is performed, processing to update the number of clock ticks of the thread being stopped is performed in S24 to S27 with processing performed by the reading processing unit 113, the calculation unit 114, and the storage control unit 115. Firstly, the reading processing unit 113 reads the clock value (clk1) from the clock counter 112 (S24), and the storage control unit 115 reads the initial clock value (clk0) and the incorporated value S from the thread context for the thread being stopped (S25). The processing in S25 may be performed before S24.

The calculation unit 114 performs arithmetic operations in expressions (3) and (4) using the clock value (clk1), the initial clock value (clk0), and the incorporated value S, which are read in S24 and S25, and updates the incorporated value S (S26). The storage control unit 115 stores the updated incorporated value S in the thread context for the thread being stopped in the storage unit 12 (S27). When the processing in S27 is performed, the processing in S12 ends (S28).

When the result of determination in S29 indicates that the event which has occurred for terminating a thread (YES in S29), processing to update the number of clock ticks of the thread being terminated is performed in S30 to S33 with processing performed by the reading processing unit 113, the calculation unit 114, and the storage control unit 115. The processing in S30 to S33 is processing that is the same as or similar to that in S24 to S27, and thus description thereof is omitted.

After the processing in S33, the storage control unit 115 stores the thread ID and the incorporated value S, which are included in the thread context for the thread being terminated, in another storage region included in the storage unit 12 (S34). Accordingly, even when the storage region for the thread context is freed, data indicating the number of operations for the terminated thread may remain. When the processing in S34 ends, the processing in S12 ends (S28).

When the result of determination in S29 indicates that the event is not for terminating a thread (NO in S29), the processing in S12 ends (S28). For example, when a thread is started immediately after the computer 1 is activated, because there is no thread being processed beforehand, it is determined in S29 that the event is not for terminating a thread.

Figure 9:
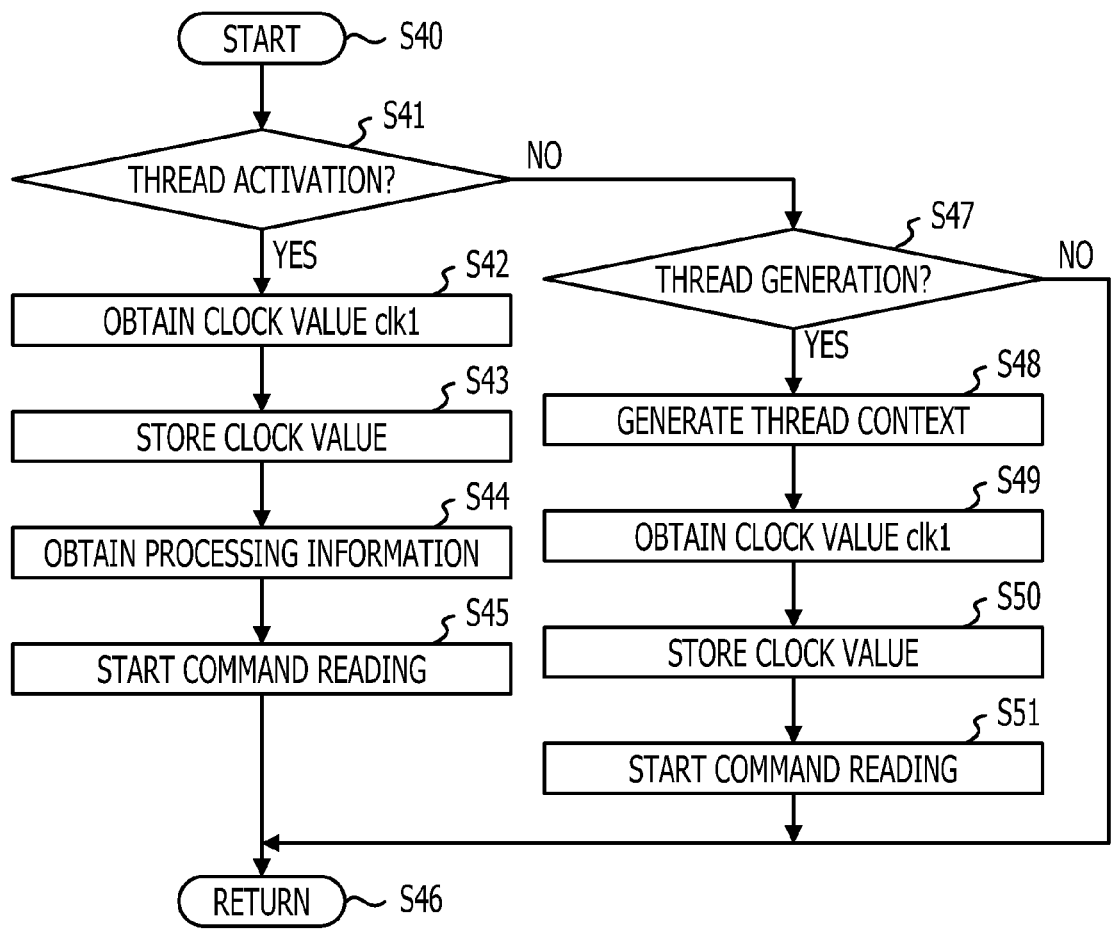
FIG. 9 illustrates a processing flowchart for thread activation and generation.

FIG. 9 illustrates a processing example of the above processing to generate or activate a thread (S13). Firstly, the execution control unit 111 determines whether the event which has occurred is to activate a thread (S41). When the event that occurred is not for activating a thread (NO in S41), the execution control unit 111 determines whether the event which has occurred is for generating a thread (S47). Generation of an event and processing performed in accordance with the generation of an event are determined by the multi-thread scheduler included in the OS 22a, in accordance with circumstances such as whether an interrupt has occurred or whether thread processing has ended.

When the event which has occurred is for activating a thread (YES in S41), the execution control unit 111 reads the clock value (clk1) from the clock counter 112 (S42). After the clock value (clk1) is read with the processing in S42, the calculation unit 114 assigns the variable clk0 with the clock value (clk1) as in expression (2). The storage control unit 115 causes the variable clk0 assigned with the clock value (clk1) to be stored in a thread context that corresponds to the thread to be activated (S43).

Furthermore, the storage control unit 115 reads, from the storage unit 12, processing information in the thread context for the thread to be activated (S44). The processing information is information used for processing of a thread to be activated, and the processing information includes, for example, values of the program counter and the stack pointer. The processing in S44 may be performed before or after the processing in S42 or S43. When the processing in S44 is performed, the execution control unit 111 causes the execution unit 110 to start processing based on the processing information read in S44 (S45). After the processing in S45 is performed, the processing in S13 ends (S46).

When the result of determination in S47 indicates that the event which has occurred is for generating a thread (YES in S47), the execution control unit 111 generates a thread context (S48). In the processing in S48, based on an instruction from the execution control unit 111, the storage control unit 115 decides on a storage region in the storage unit 12 to store the thread context, and causes the thread ID of a thread that is to be generated to be stored in the storage region.

The reading processing unit 113 reads the clock value (clk1) from the clock counter 112 (S49). The processing in S49 may be performed before the processing in S48. When the clock value (clk1) is read with the processing in S49, the calculation unit 114 assigns the variable clk0 with the clock value (clk1) as in expression (2). The storage control unit 115 causes the variable clk0 assigned with the clock value (clk1) to be stored in the thread context for the thread to be generated (S50). When the processing in S50 is performed, the execution control unit 111 causes the execution unit 110 to start processing (S51). When the processing in S51 is performed, the processing in S13 ends (S46). When the processing in S13 ends, the execution control unit 111 performs the processing in S11 and detects the occurrence of an event of thread control.

When the computer 1 performs the above processing, the number of clock ticks involved in processing performed by the processor 301 is counted for each thread and process running on the computer 1. Because power is consumed by the operation of the processor 301, measurement of the actual number of operations performed by the processor 301 is meaningful in estimating the cost involved in the operation of the processor 301, such as the power consumption of the processor 301. For example, a related art method, which estimates the power consumption of the processor 301 in accordance with the occupied time, results in inconsistency in power consumption before and after the operating frequency is varied. In contrast, with the above processing, because the actual number of operations of the processor 301 is obtained, even when the operating frequency of the processor 301 varies, the amount of power consumption is estimated in accordance with the varied operating frequency. In the first embodiment, because the number of clock ticks involved in processing is counted for each process or thread, the number of operations, which is meaningful in estimating the power consumption in each process or thread, is detectable. In addition, besides power consumption, the computer 1 may estimate, as a cost involved in the operation of the processor 301, for example, the amount of carbon dioxide generated by generation of power consumed by the processor 301, or the amount of heat radiated by the processor 301, in accordance with the number of operations of the processor 301.

An estimated value for power consumption is calculated, for example, by calculating in advance the power consumed by the processor 301 per clock tick and multiplying the number of clock ticks counted in the first embodiment by the power consumed per clock tick, which is calculated in advance. Similarly, an estimated value of the amount of carbon dioxide is calculated, for example, by multiplying the amount of carbon dioxide emitted in response to one clock tick of the processor 301, which is calculated in advance, with the number of clock ticks counted in the first embodiment. In addition, for example, when calculating the amount of emitted carbon dioxide, the amount of the value to be multiplied by the number of clock ticks counted in the first embodiment may be changed in accordance with a power generation style of the power supplied to the processor 301. For example, two types of values may be used: one for power generation using fossil fuel and one for power generation using renewable energy. Similarly, the amount of heat generated by the processor 301 may be obtained by an arithmetic operation such as multiplying a value that indicates the amount of heat emitted by the processor 301 per clock tick, which is calculated in advance, with the number of clock ticks.

In addition to charging and discharging electricity through the circuit in the processor 301, the processor 301 also consumes power due current leakage. Therefore, for example, when calculating power consumption, the execution unit 110 adds the power consumption due to current leakage to the power consumption obtained based on the number of clock ticks, and outputs the sum value. Power consumption due to the leak current is calculated as follows. For example, the time involved in processing each process or thread is measured with processing that is the same as or similar to how the number of clock ticks are counted by the processing unit 11. The execution unit 110 multiplies the measured time with the power consumption due to current leakage per unit time. At this point, when reading the number of clock ticks from the clock counter 112, the reading processing unit 113 included in the processing unit 11 obtains time information from a timer. Furthermore, the execution control unit 111 and the storage control unit 115 perform processing which is the same as a similar to how the number of clock ticks are counted, and stores, in a process context or a thread context, an integrated time that is used in processing.

A second embodiment is described below. In the second embodiment, the computer 1 in the first embodiment is used. In the second embodiment, the application program 23c running on the computer 1 performs processing to visualize the number of operations of the processor 301 performing processing for the application programs 23a and 23b. The execution unit 110 performs, for example, visualizing processing described below based on the application program 23c.

FIGS. 10A to 10C illustrate tables T2a to T2c (hereinafter may also be collectively referred to as "table T2") indicating the relationship between a process and a thread. The table T2a illustrated in FIG. 10A indicates that a process whose process ID is "A-1" includes a thread whose thread ID is "a". The table T2b illustrated in FIG. 10B indicates that a process whose process ID is "B-1" includes a thread whose thread ID is "b" and a thread whose thread ID is "c". The table T2c illustrated in FIG. 10C indicates that a process whose process ID is "A-2" includes a thread whose thread ID is "d". As illustrated in FIG. 10B, two or more threads may be generated in one process. Tables indicating the relationship between a process and a thread are not limited to those illustrated in FIGS. 10A to 10C. A table is generated for each process running on the computer 1.

Figure 11:
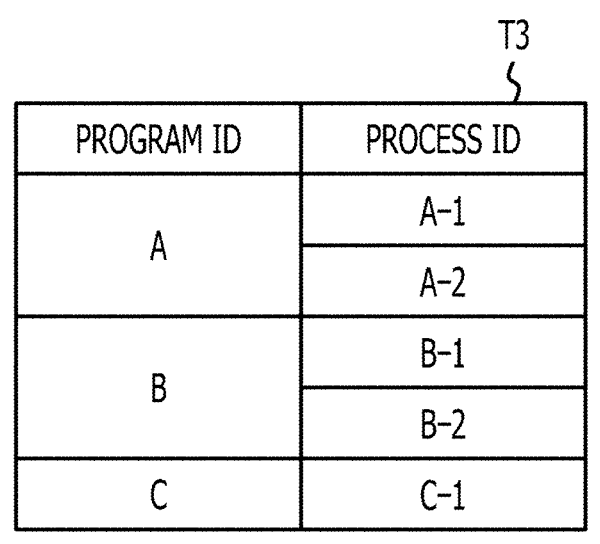

FIG. 11 illustrates a table T3 indicating the relationship between a program and a process. The table T3 includes information for associating a program that is being executed by the computer 1 or was executed in the past by the computer 1 with a process, which is a processing unit of each program. The tables T2 and T3 are stored in the storage unit 12. In FIG. 11, a program ID "A" is associated with process IDs "A-1" and "A-2"; a program ID "B" is associated with process IDs "B-1" and "B-2"; and a program ID "C" is associated with a process ID "C-1". As an example, the program ID of the application program 23a is "A"; the program ID of the application program 23b is "B"; and the program ID of the application program 23c is "C".

The execution unit 110 extracts information about a program, process, and thread running on the computer 1, and updates the table T2 that indicates the relationship between a process and a thread and the table T3 that indicates the relationship between a program and a process. The updating is performed periodically, at timing in accordance with an operation performed on the computer 1, or at given timing. When an update time has arrived, the execution unit 110 updates the table T2 by obtaining the thread ID(s) stored in the process context of each process, and storing the obtained thread ID(s) in one of the tables T2 corresponding to the individual processes. When an update time has arrived, the execution unit 110 updates the table T3 by obtaining the process ID(s) stored in a process management table (not illustrated), which is used by the execution control unit 111 for performing process control, and storing the obtained process ID(s) in the table T3 in association with each program.

Furthermore, the execution unit 110 collects the incorporated value S from the thread context or process context for each thread or process performed on the computer 1, and calculates the number of operations for each program running on the computer 1 based on the collected integrated values S, and the tables T2 and T3. When differences d are stored in place of the incorporated value S in each process context or thread context, the sum of the differences d stored in each process context or thread context is calculated, and the sum is treated as the incorporated value S for a given program. The number of operations for each program is managed using, for example, a table T4 illustrated in FIG. 12. In the table T4, the program ID of each program is associated with the number of program operations T for the program.

Figure 13:
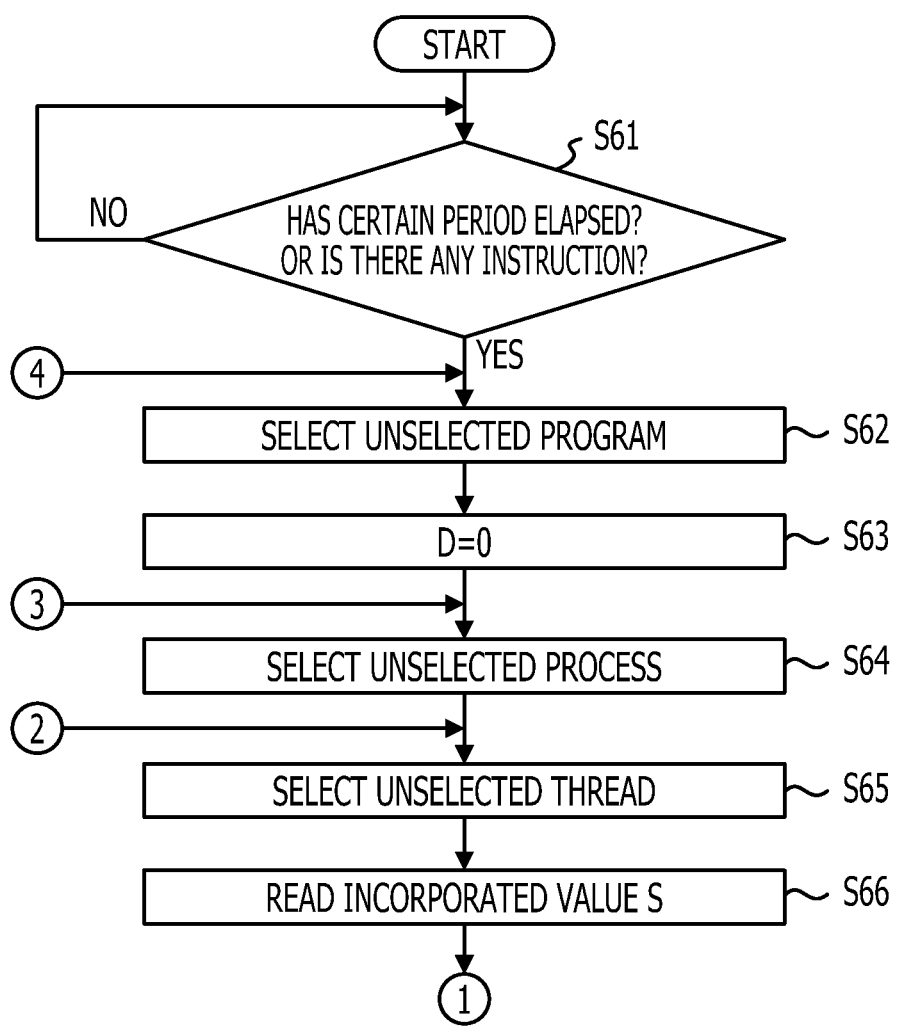
FIG. 13 illustrates the flowchart of calculating the number of operations for each program.

FIG. 13 illustrates the flowchart of calculating the number of program operations T for each program. This processing is performed by the execution unit 110 in accordance with the application program 23c. Calculation of the number of program operations T is performed periodically, at timing in accordance with an operation performed on the computer 1, or at given timing, as with the updates of the tables T2 and T3. In processing in S61, whether that timing has arrived is determined. When it is determined that the timing to calculate the number of program operations T has arrived (YES in S61), the execution unit 110 selects an unselected program ID from among the program IDs indicated in the table T3 (S62). The execution control unit 111 clears a variable D that indicates the number of operations for the program ID selected in S62 (S63). The processing in S63 may be performed before the processing in S62.

Next, the execution unit 110 selects an unselected process ID from among process IDs associated with the program ID selected in S62 from the table T3 (S64). After the processing in S64, the execution unit 110 selects an unselected thread ID from among thread IDs associated with the process ID selected in S64 (S65).

The execution unit 110 reads the incorporated value S from a thread context corresponding to the thread ID selected in S65 (S66). After the processing in S66, the execution unit 110 updates the value of the variable D to be the sum of the incorporated value S, which is read in S66, and the variable D (S67). That is, the execution unit 110 performs an arithmetic operation of D=D+S where "=" is an operand that indicates assignment. At this point, the execution unit 110 clears the incorporated value S (S=0) included in the thread context (S68).

After the processing in S68, the execution unit 110 determines whether there is an unselected thread ID among the thread IDs associated with the process ID selected in S64 in the table T2. When the result of determination in S68 indicates that there is an unselected thread ID (YES in S69), the execution unit 110 performs the processing in S65 again. When the result of determination in S69 indicates that there is no unselected thread ID (NO in S69), the execution unit 110 determines whether there is an unselected process ID among the process IDs associated with the program ID selected in S62 from the table T3 (S70). When the result of determination in S70 indicates that there is an unselected process ID (YES in S70), the execution unit 110 performs the processing in S64 again.

When the result of determination in S70 indicates that there is no unselected process ID (NO in S70), the execution unit 110 updates the number of program operations T associated with the selected program ID in the table T4 (S71). That is, the execution unit 110 performs an arithmetic operation of T=T+D where "=" is an operand indicating assignment. After the processing in S71, the execution unit 110 determines whether there is an unselected program ID among the program IDs indicated in the table T3 (S72). When the result of determination in S72 indicates that there is an unselected program ID (YES in S72), the execution unit 110 performs the processing in S62 again.

When the result of determination in S72 indicates that there is no unselected program ID (NO in S72), the execution unit 110 determines whether there is a request to perform display processing (S73). For example, when a user inputs a display request or when a display request from another apparatus is received, it is determined that there is a request to perform display processing. When there is no request to perform display processing (NO in S73), the execution unit 110 terminates the processing (S75).

When the result of determination in S73 indicates that there is a request to perform display processing (YES in S73), for example, screen information 41 illustrated in FIG. 15 is generated (S74). When a display request from a user is received, the execution unit 110 displays the generated screen information 41 on the output device 312. When a display request from another apparatus is received, the execution unit 110 sends the screen information 41 to the apparatus that sent the display request. The screen information 41 illustrated in FIG. 15 includes information that indicates the number of clock ticks, power consumption, heat emitted, and the amount of carbon dioxide consumption for each application. As described in the first embodiment, power consumption and the amount of emitted carbon dioxide of each application may be calculated by, for example, respectively multiplying the power consumption per clock tick and the amount of emitted carbon dioxide per clock tick by the number of program operations T.

A third embodiment is described below. In the third embodiment, the hardware of the computer 1 in the first embodiment is used. The third embodiment is different in software configuration from the first and second embodiments.

Figure 16:
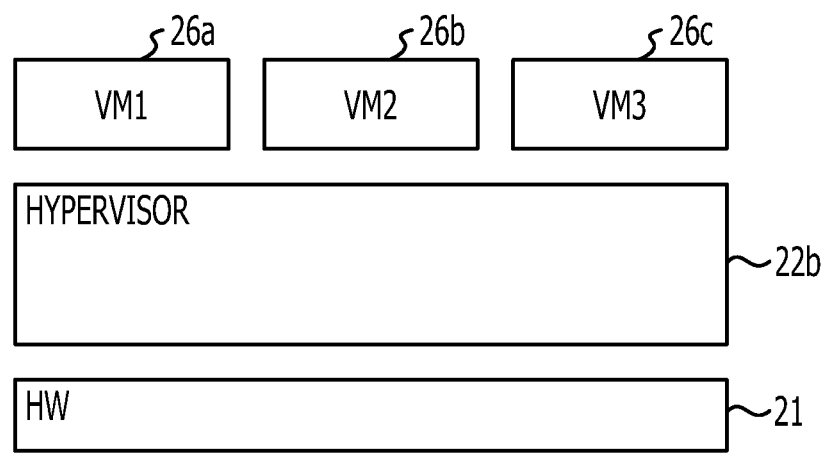
FIG. 16 illustrates an example of the software configuration of the computer 1.

FIG. 16 illustrates an example of the software configuration of the computer 1 according to the third embodiment. Plural virtual machines 26*a* to 26*c* run on the computer 1. The hardware 21 for performing processing of the individual virtual machines 26*a* to 26*c* is controlled by a hypervisor 22*b*.

In addition in the third embodiment, the computer 1 includes the execution unit 110, the execution control unit 111, the clock counter 112, the reading processing unit 113, the calculation unit 114, and the storage control unit 115. With processing based on the hypervisor 22*b* in the third embodiment, the processor 301 realizes the functions of the execution control unit 111, the reading processing unit 113, the calculation unit 114, and the storage control unit 115 in the first embodiment. In the third embodiment, the number of operations of the processor 301 for each process or thread, which is a processing unit of the processing for each of the virtual machines 26*a* to 26*c*, is counted under control of the hypervisor 22*b*.

In the third embodiment, the virtual machine 26*c* is a virtual machine for managing the number of operations. Processing performed by the execution unit 110 based on the virtual machine 26*c* is described below with reference to FIG. 17.

Firstly, the execution unit 110 performs processing to measure the number of operations for each application program, as in processing in S61 to S72 in the second embodiment (S81). Next, the execution unit 110 selects unselected virtual machine identification information (VMID) from among VMIDs included in a virtual machine management table T5 illustrated in FIG. 18 (S82). Here, as an example the VMID of the virtual machine 26*a* is "X"; the VMID of the virtual machine 26*b* is "Y"; and the VMID of the virtual machine 26*c* is "Z". When the processing in S82 is performed, a variable U indicating the number of operations for each virtual machine is cleared (S83). Furthermore, the execution unit 110 selects an unselected program from among programs associated with the VMID selected in S82 in the virtual machine management table T5 (S84). The execution unit 110 reads, from the table T5, a number of program operations T for the program selected in S84, and updates the variable U based on the read number of program operations U (S85). For example, the execution unit 110 updates the variable U by assigning the variable U with the sum of the variable U and the number of program operations T.

Figure 18:
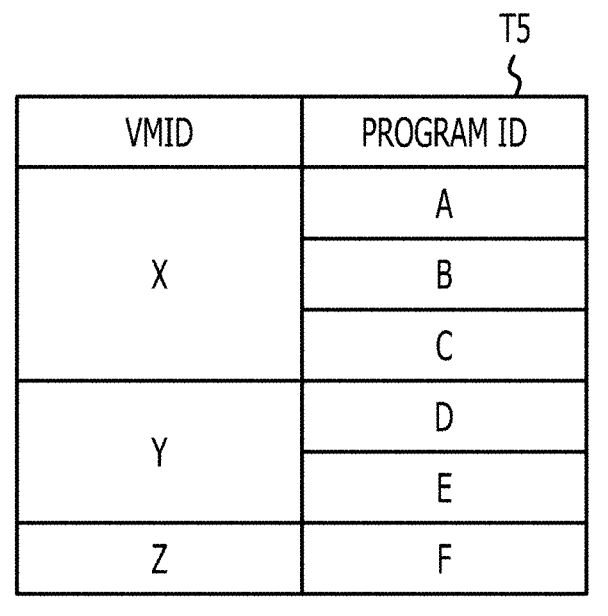

When the processing in S85 is performed, the execution unit 110 determines whether there is an unselected program among the programs associated with the VMID selected in S82 in the virtual machine management table T5 illustrated in FIG. 18 (S86). When the result of determination in S86 indicates that there is an unselected program (YES in S86), the execution unit 110 performs the processing in S84 again.

When the result of determination in S86 indicates that there is no unselected program (NO in S86), the execution unit 110 associates the value of the variable U and the VMID selected in S82, and stores the associated U and VMID in a table T6 illustrated in FIG. 19 (S87). After the processing in S87, the execution unit 110 determines whether there is an unselected VMID among the VMIDs included in the table T5 (S88). When the result of determination in S88 indicates that there is an unselected VMID (YES in S88), the execution unit 110 performs the processing in S82 again.

When the result of determination in S88 indicates that there is no unselected VM (NO in S88), the execution unit 110 performs the processing as in S73 and S74 from the second embodiment (S89). For example, the execution unit 110 generates screen information in response to a request, and performs processing to send the generated screen information or display the generated screen information.

FIG. 20 illustrates an example of screen information in the third embodiment. Screen information 42 is screen information that indicates the number of operations of the virtual machine 26*a* for the user using the virtual machine 26*a*. As illustrated in FIG. 20, in order to generate screen information that includes the usage status for each month, for example, at the end of each month, the execution unit 110 copies the table T6 to another storage region, and clears information about the virtual machine (VM) operation amount included in the table T6. Furthermore, when generating screen information, the execution unit 110 reads, for the VMID to be displayed, the VM operation amount, which is stored in the table T6, and the VM operation amounts for the past months, which are stored in other storage regions. Similarly to the second embodiment, the execution unit 110 multiplies each of the read VM operation amounts by the power consumption amount per clock tick and the carbon dioxide emission amount per clock tick, thereby respectively calculating the power consumption and the carbon dioxide emission amount for each month. A fee charged for each month is determined in accordance with a given contract, such as a value obtained by multiplying a fee per clock tick with the number of clock ticks, as in power consumption.

A fourth embodiment will be described below. In the fourth embodiment, as in the third embodiment, each virtual machine runs on the computer 1. Furthermore, a virtual machine that has the functions of a driver that controls the hardware 21, which performs processing for each virtual machine running on the computer 1, further runs on the computer 1. In contrast, in the third embodiment, for example, the hypervisor 22b has a driver function. As in the third embodiment, the virtual machine 26c is, for example, a virtual machine that manages the number of operations.

Figure 21:
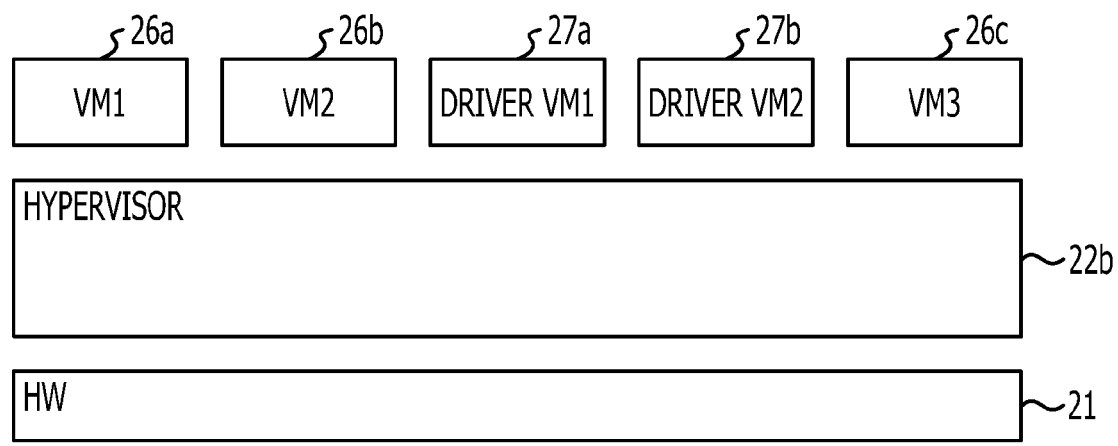
FIG. 21 illustrates an example of the software configuration of the computer.

FIG. 21 illustrates an example of the software conflagration of the computer 1 in the fourth embodiment. In addition to the software configuration in the third embodiment, which is illustrated in FIG. 16, a driver VM 27a and a driver VM 27b are running. Hardware for performing processing for the VM 26a is controlled based on the driver VM 27a. In addition, hardware for performing inputting and outputting for the VM 26b is controlled based on the driver VM 27b.

A table T7 illustrated in FIG. 22 indicates a virtual machine management table in the fourth embodiment. The virtual machine management table T7 is a table storing data that associates, for each virtual machine, the ID of the virtual machine (including a driver VM) running on the computer 1 with the ID of a program running on the virtual machine. In the virtual machine management table T7, the ID of the driver VM 27a is "XX", and the ID of the driver VM 27b is "YY". In the virtual machine management table T7, the relationship between VMs is also indicated. For example, the virtual machine management table T7 includes, as information indicating a relationship, the VMID "X" associated with the VMID "XX". This information indicates that a virtual machine whose VMID is "XX" is a virtual machine that performs processing for the virtual machine whose VMID is "X".

Figure 17:
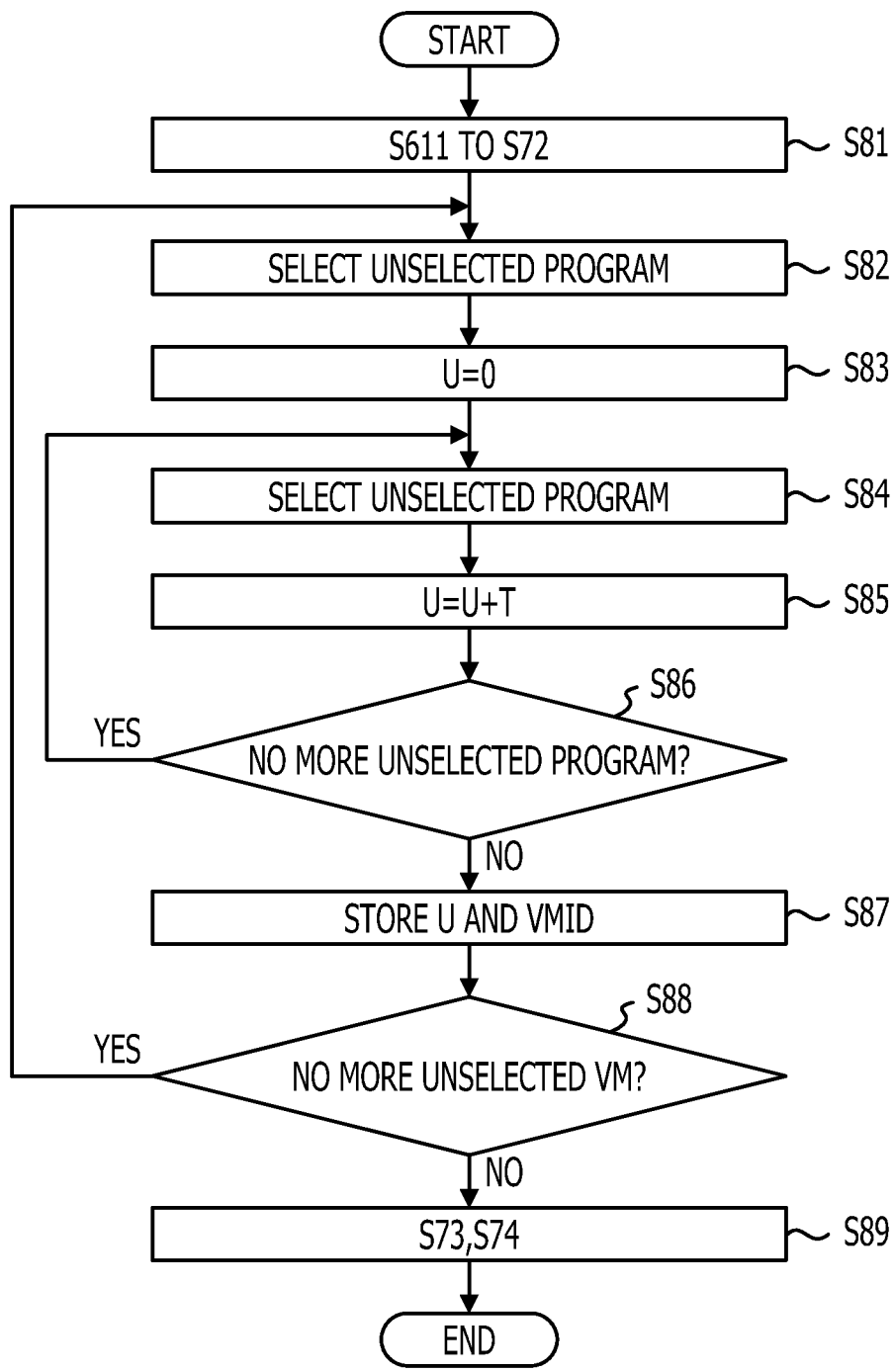
FIG. 17 illustrates the flowchart of calculating the number of operations for each virtual machine.

In the fourth embodiment, the execution unit 110 performs the flowchart illustrated in FIG. 17 based on the virtual machine 26c. Unlike in the third embodiment, in S82, the driver VMs 26a, 26b and 26c are also selected. With the execution unit 110 performing the flowchart in S82 to S88, the number of operations for each virtual machine running on the computer 1 is calculated. FIG. 23 illustrates the number of operations for each virtual machine. Furthermore, in the flowchart in S89 illustrated in FIG. 17, the execution unit 110 performs the above display processing. In the fourth embodiment, for virtual machines that are associated with each other in the virtual machine management table T7, the execution unit 110 calculates the sum of the number of operations for the associated virtual machines, and displays the calculated sum.

In the fourth embodiment, by performing the above processing, in addition to arithmetic processing that is performed by the processor 301 for a program to be measured, the number of operations for hardware control performed by the processor 301 is also measurable. In addition, regarding a coefficient that is used as a multiplicand when calculating the power consumption, for example, the coefficient to be multiplied by the number of operations for each of the virtual machines 26a to 26c is a different value to a coefficient to be multiplied by the number of operations for each of the driver VMs 27a and 27b. For example, for the driver VMs 27a and 27b, a coefficient may set which also takes into consideration the power consumption of hardware controlled by each of the driver VMs 27a and 27b.

Hereinafter, a fifth embodiment will be described. The fifth embodiment is, for example, an embodiment in a system illustrated in FIG. 24, including the computer 1 in the first embodiment.

Figure 24:
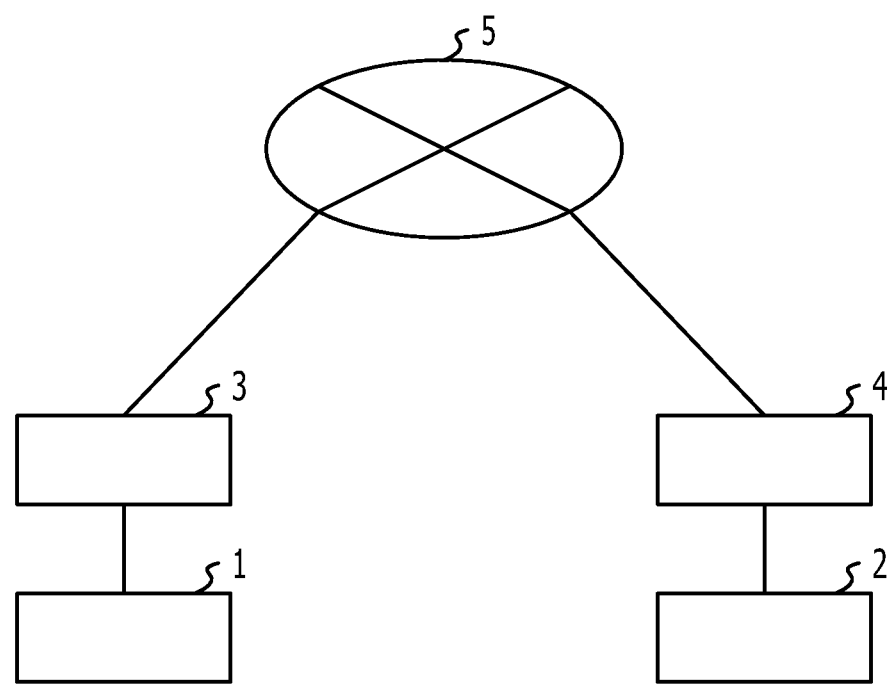
FIG. 24 illustrates an example of the configuration of a system.

The system illustrated in FIG. 24 includes the computer 1, a computer 2, a relay apparatus 3, a relay apparatus 4, and a network 5. The computer 1 has hardware configuration and functional configuration that are the same as or are similar to those of the computer 1 in the first to fourth embodiments. The computer 2 is, for example, a computer that has a hardware configuration that is the same as or is similar to that of the computer 1. The relay apparatus 3 is an apparatus that relays communication between the computer 1 and the network 5. The relay apparatus 4 is an apparatus that relays communication between the computer 2 and the network 5. For example, the computer 2 is a computer to which services are provided by virtual machines running on the computer 1. Alternatively, a computer to which services are provided is not limited to the computer 2 illustrated in FIG. 24. For example, services may be provided to multiple computers (not illustrated).

In the fifth embodiment, the number of operations of the processor 301 is measured for each destination to which services are provided. Measurement for each destination to which services are provided means measuring the number of operations performed by the processor 301, which is performed for each instance of processing for an access source that requests services to be provided. For example, the measurement means measuring the number of operations of the computer 1 for processing performed in units of users who have been authenticated to receive services (in units of accounts that may be identified with a user ID or the like), or in units of internet protocol (IP) addresses or the like of the sources of requests for services.

Figure 25:
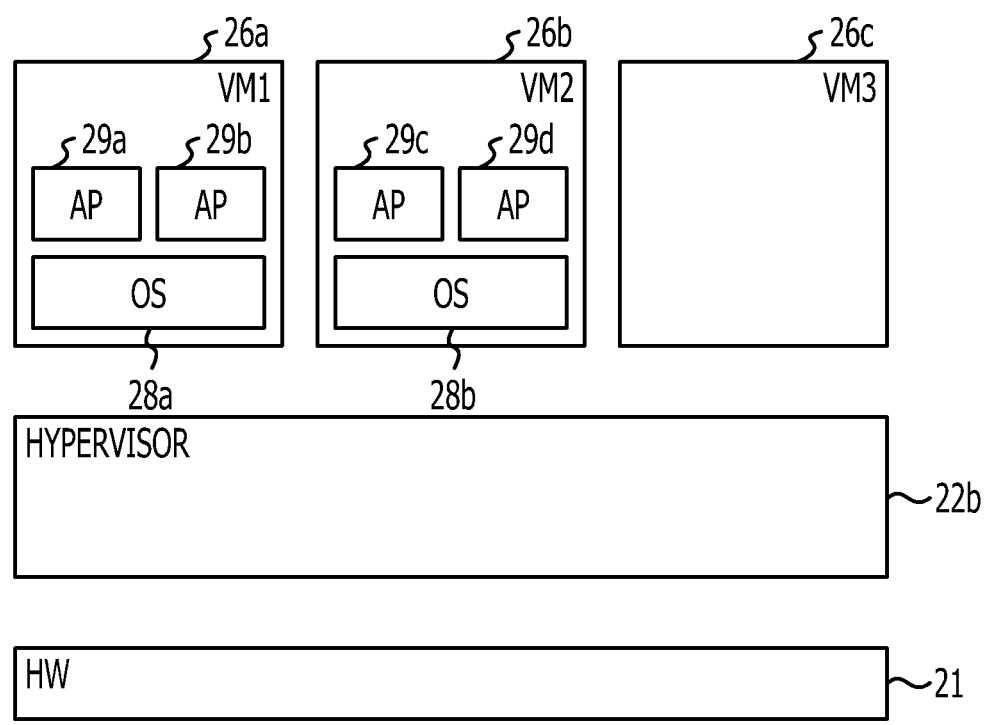
FIG. 25 illustrates an example of the software configuration of the computer.

FIG. 25 illustrates an example of the software configuration of the computer 1. As in the third embodiment, the hypervisor 22b and the virtual machines 26a to 26c run on the computer 1. In the fifth embodiment, the virtual machine 26a includes an OS 28a, an application program 29a, and an application program 29b. The virtual machine 26b includes an OS 28b, an application program 29c, and an application program 29d. The virtual machines 26a and 26b are both not limited to the software configuration illustrated in FIG. 25; other application programs may run on the computer 1.

In the fifth embodiment, services are provided to another computer based on the application program 29a. Based on the application program 29b, the number of operations of each application program included in the virtual machine 26a is managed. As with the OS 22a in the first embodiment, the OS 28a is software for performing hardware control in accordance with each application program running on the OS 28a. The OS 28a causes the number of operations for each application program running on the OS 28a to be counted. Unlike in the first embodiment, in the fifth embodiment, control performed by the OS 28a is control performed on the hypervisor 22b, which emulates the hardware 21. The hardware 21 performs processing in accordance with control of the hypervisor 22b.

Figure 26:
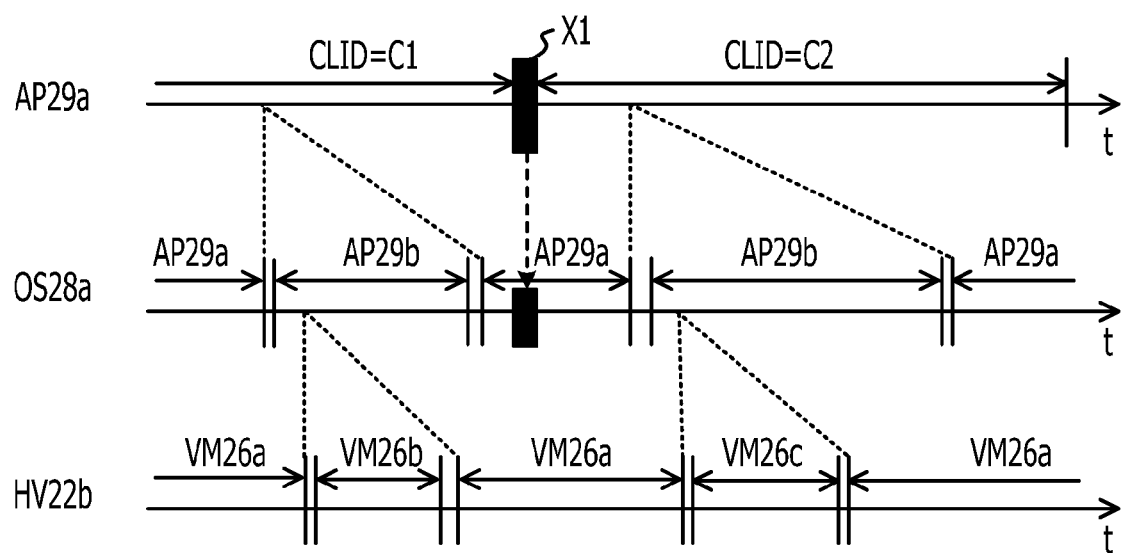
FIG. 26 illustrates an example of the sequence of switching a unit.

FIG. 26 is a sequence diagram illustrating the timing of switching of a unit to be measured. That is, the switching timing illustrated in FIG. 26 is, for example, switching of a unit to be processed by the application program 29a, switching of a unit to be processed by the OS 28a, or switching of a VM to be processed by the hypervisor 22b. A unit to be processed by the application program 29a is a unit (a unit to be processed, such as a user (account) or address) identifiable by a service (provided by the application program 26a). In FIG. 26, a unit is identified by identification information called "CLID". The identification information CLID is, for example, a user ID, or the address of the source of a processing request.

A VM to be processed is switched by the hypervisor 22b. In a period in which processing of the VM 26a is performed, the hypervisor 22b performs processing of an application program to be processed by the OS 28a.

An application to be processed is switched by the OS 28a. Switching of an application to be processed is substantially performed by, as was described in the first embodiment, switching of a process or a thread. Under control of the OS 28a, the value of a clock counter is read in accordance with the switching of a process or a thread (including stopping, terminating, activating, and generating a process or thread). The value of the clock counter read this at this point is a clock counter emulated by the hypervisor 22b, and this value is a value that may be obtained by counting the number of clock ticks involved in processing for the VM 26a.

A unit to be processed is switched by the application program 29a. In FIG. 26, a unit in which the identification information CLID is Cl is switched to a unit in which the identification information CLID is C2 (X1). With the switching (X1), the application program 29a causes the OS 28a to be notified of the switching. Notification of the switching includes the identification information CLID of the unit at the switching destination. In accordance with the switching notification from the application program 29a, the OS 28a performs the clock counting processing and changes the storage location of the counter value. The clock counting processing is performed in a similar fashion to the counting in accordance with switching of an application (see FIGS. 7 to 9). Changing the storage location of the counter value is processing to switch a thread context or a process context that stores the incorporated value S of the number of clock ticks. In the fifth embodiment, a thread context and a process context are provided for each unit to be processed, which will be described below.

FIGS. 27A to 27C and FIG. 28 illustrate examples of a management table for managing a program, a process, and a thread in the fifth embodiment. In the fifth embodiment, for example, a program, a process, and a thread are managed for each target to be processed. That is, the identification information CLID of each target to be processed is added to the IDs of a program, a process, and a thread included in the tables illustrated in FIGS. 5, 11, and 12, and the identification information CLID and the IDs are managed.

FIGS. 27A to 27C illustrate the relationship between processes and threads. In the fifth embodiment, the OS 28a adds the identification information CLID, given in the notification, to both the process ID and the thread ID. FIG. 28 illustrates the relationship between programs and processes. In the fifth embodiment, the OS 28a adds the identification information CLID, given in the notification, to both the program ID and the process ID.

When the OS 28a changes the storage location, if information as illustrated in FIGS. 27A to 27C and FIG. 28 is not present for a unit to be processed at a switching destination, information for management is generated based on the identification information CLID included in the notification from the application program 29a. For example, information to be generated includes information indicating the relationship between a program and a process and information indicating the relationship between a process and a thread, as illustrated in FIGS. 27A to 27C and FIG. 28, as well as a thread context and a process context for each CLID.

As with the application program 23c in the second embodiment, the application program 29b is, for example, an application program that manages the number of operations of an application running on the OS 28a. A table T11 illustrated in FIG. 29 is managed by the application program 29b. FIG. 29 illustrates the table T11, which is a table that stores the number of operations of each processing unit for each program running according to the OS 28a.

Figure 14:
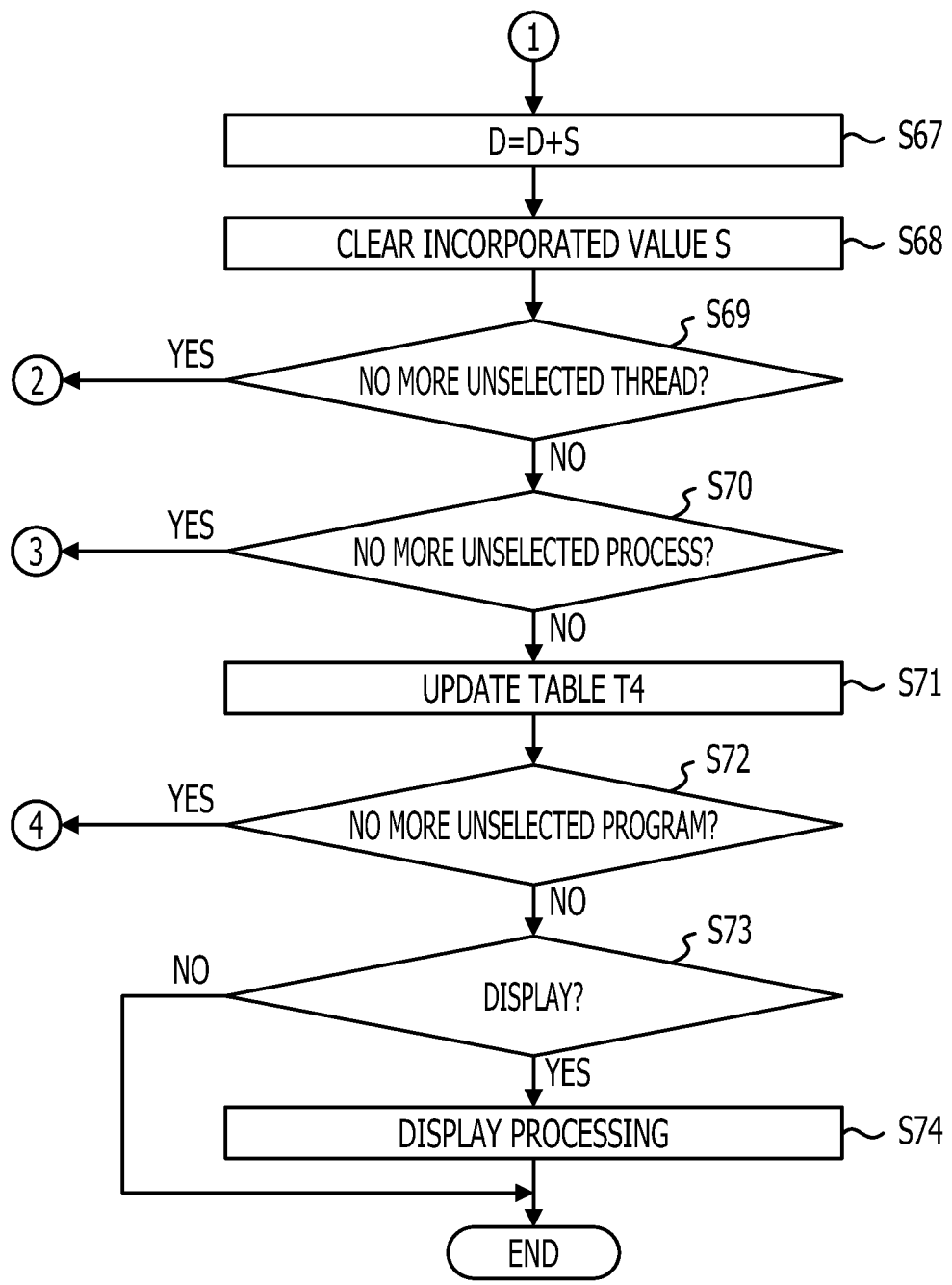
FIG. 14 illustrates the flowchart of calculating the number of operations for each program.

The application program 29b updates the table T11 illustrated in FIG. 29, based on the relationships illustrated in FIGS. 27A to 27C and FIG. 28, and the value of the incorporated value S stored in each thread context or each process context. The updating is performed with processing that is similar to the update of the table T4, which is illustrated in FIGS. 13 and 14. Accordingly, the application program 29b measures the number of operations of the processor 301 involved in processing for each unit to be processed, which is identifiable. Screen information generated by the application program 29b is sent to, for example, the appropriate processing target by using a tool such as e-mail. The screen information is, for example, screen information that indicates the result of measurement of the number of operations, which, for example, is illustrated in FIG. 15 or FIG. 20. Accordingly, a user who receives provided services becomes capable of understanding the number of operations of the processor 301 that is involved in providing the services.

In any of the first to fifth embodiments described above, for example, the processor 301 may include multiple cores. In accordance with process or thread control, an OS reads a value from a clock counter provided in each of the cores of the processor 301 to which a process or a thread is allocated, thereby calculating the number of operations involved in processing performed by each of the cores.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A calculation method comprising:
calculating, by a processor, a difference between a first value and a second value, the first value being read from a clock counter that counts pulses of a clock signal having a plurality of types of frequencies, supplied to the processor in response to start first processing for a unit to be allocated to the processor, the second value being read from the clock counter in response to stop the first processing;
calculating a cost value obtained by multiplying the calculated difference with a coefficient indicating a cost value for a certain type per unit number of clock ticks;
storing, in a storage device, the calculated difference in association with identification information that identifies the unit;
calculating a difference between a third value and a fourth value, the third value being read from the clock counter in response to start second processing further performed when processing of the unit is to be further performed, the fourth value being read from the clock counter in response to stop the second processing that has been controlled to start;

storing, in the storage device, an incorporated value in association with the identification information, the incorporated value being obtained by adding the difference calculated based on the third value and the fourth value to the difference stored in the storage device in association with the identification information;

calculating a difference between a fifth value and a sixth value, the fifth value being read from the clock counter in response to start third processing of another unit when processing of the other unit is to be performed, the sixth value being read from the clock counter in response to stop the third processing of the other unit; and storing, in the storage device, when the other unit is a unit for a program that is the same as the program of the unit, a sum of the incorporated value and the difference calculated based on the fifth value and the sixth value, in association with program identification information that identifies the program.

2. The calculating method according to claim 1, wherein whether to stop processing of at least one of the first processing, the second processing, and the third processing is determined in accordance with a processing status of the processor.

3. The calculating method according to claim 1, further comprising:

calculating a difference between a seventh value and an eighth value when processing of a unit of a driver program that causes execution of at least one of input control and output control for the program is performed, the seventh value being read from the clock counter in response to start processing the unit of the driver program, the eighth value being read from the clock counter in response to stop the processing of the unit of the driver program; and storing, in the storage device, a sum of the difference based on the seventh value and the eighth value and the sum of the integrated value and the difference calculated based on the fifth value and the sixth value, in association with the program identification information.

4. The calculating method according to claim 1, wherein the unit is one of a thread serving as a target of multithreading control, a process serving as a target of multitasking control, and a unit of processing performed for an access source that accesses the computer.

5. A non-transitory computer-readable recording medium storing a calculation program that causes a computer to execute a procedure, the procedure comprising:

calculating a difference between a first value and a second value, the first value being read from a clock counter that counts pulses of a clock signal having a plurality of types of frequencies, supplied to a processor included in the computer in response to start first processing for a unit to be allocated to the processor, the second value being read from the clock counter in response to stop the first processing;

calculating a cost value obtained by multiplying the calculated difference with a coefficient indicating a cost value for a certain type per unit number of clock ticks storing, in a storage device of the computer, the calculated difference in association with identification information that identifies the unit;

calculating a difference between a third value and a fourth value, the third value being read from the clock counter in response to start second processing further performed when processing of the unit is to be further performed, the fourth value being read from the clock counter in response to stop the second processing that has been controlled to start;

storing, in the storage device, an incorporated value in association with the identification information, the incorporated value being obtained by adding the difference calculated based on the third value and the fourth value to the difference stored in the storage device in association with the identification information;

calculating a difference between a fifth value and a sixth value, the fifth value being read from the clock counter in response to start third processing of another unit when processing of the other unit is to be performed, the sixth value being read from the clock counter in response to stop the third processing of the other unit; and storing, in the storage device, when the other unit is a unit for a program that is the same as the program of the unit, a sum of the incorporated value and the difference calculated based on the fifth value and the sixth value, in association with program identification information that identifies the program.

6. The recording medium according to claim 5, wherein the unit is one of a thread serving as a target of multithreading control, a process serving as a target of multitasking control, and a unit of processing performed for an access source that accesses the computer.

7. A calculation apparatus comprising:

a clock counter that counts a clock signal having a plurality of types of frequency;

a processor supplied the clock signal that executes a procedure, the procedure including:

calculating a difference between a first value and a second value, the first value being read from a clock counter that counts pulses of a clock signal having a plurality of types of frequencies, supplied to the processor included in the calculation apparatus in response to start first processing for a unit to be allocated to the processor, the second value being read from the clock counter in response to stop the first processing;

calculating a cost value obtained by multiplying the calculated difference with a coefficient indicating a cost value for a certain type per unit number of clock ticks;

calculating a cost value obtained by multiplying the calculated difference with a coefficient indicating a cost value for a certain type per unit number of clock ticks;

storing, in a storage device, the calculated difference in association with identification information that identifies the unit;

calculating a difference between a third value and a fourth value, the third value being read from the clock counter in response to start second processing further performed when processing of the unit is to be further performed, the fourth value being read from the clock counter in response to stop the second processing that has been controlled to start;

storing, in the storage device, an incorporated value in association with the identification information, the incorporated value being obtained by adding the difference calculated based on the third value and the fourth value to the difference stored in the storage device in association with the identification information;

calculating a difference between a fifth value and a sixth value, the fifth value being read from the clock counter in response to start third processing of another unit when processing of the other unit is to be performed, the sixth value being read from the clock counter in response to stop the third processing of the other unit; and storing, in the storage device, when the other unit is a unit for a program that is the same as the program of the unit, a sum of the incorporated value and the difference calculated based on the fifth value and the sixth value, in association with program identification information that identifies the program.

8. The calculation apparatus according to claim 7, wherein the unit is one of a thread serving as a target of multithreading control, a process serving as a target of multitasking control, and a unit of processing performed for an access source that accesses the computer.

\* \* \* \* \*